United States Patent
West et al.

(10) Patent No.: US 9,892,378 B2
(45) Date of Patent: *Feb. 13, 2018

(54) DEVICES, SYSTEMS AND METHODS FOR TRACKING AND AUDITING SHIPMENT ITEMS

(71) Applicant: BluePoint Mobile Solutions, Inc., Roswell, GA (US)

(72) Inventors: Thomas P. West, Roswell, GA (US); Kenneth L. Monroe, Calhoun, GA (US)

(73) Assignee: BluePoint Mobile Solutoins, Inc., Roswell, GA (US)

( * ) Notice: Subject to any disclaimer, the term of this patent is extended or adjusted under 35 U.S.C. 154(b) by 232 days.

This patent is subject to a terminal disclaimer.

(21) Appl. No.: 14/590,757

(22) Filed: Jan. 6, 2015

(65) Prior Publication Data
US 2016/0034847 A1      Feb. 4, 2016

Related U.S. Application Data

(60) Provisional application No. 62/031,456, filed on Jul. 31, 2014.

(51) Int. Cl.
*G06Q 10/08* (2012.01)
*G11B 27/28* (2006.01)
(Continued)

(52) U.S. Cl.
CPC ........... *G06Q 10/0833* (2013.01); *B60R 1/00* (2013.01); *G11B 27/28* (2013.01); *G11B 31/006* (2013.01);
(Continued)

(58) Field of Classification Search
CPC .. G06Q 10/0833; G11B 27/28; G11B 31/006; H04N 5/7605; H04N 5/77; H04N 5/772; H04N 9/8205
(Continued)

(56) References Cited

U.S. PATENT DOCUMENTS 4,462,045 A      7/1984  Norris
5,457,629 A     10/1995  Miller
(Continued)

OTHER PUBLICATIONS

AutoVISION, Microscan Products, Microscan Inc.—retrieved from the web on Aug. 8, 2014 (http://www.microscan.com/en-us/products/newproducts/vmi.aspx), p. 3, p. 5, p. 7.
(Continued)

*Primary Examiner* — Gelek W Topgyal
(74) *Attorney, Agent, or Firm* — Bryan Cave LLP

(57) ABSTRACT

Devices, systems and methods for tracking and auditing shipment items are provided by capturing video of the shipment items handled in a facility. In certain embodiments, tracking devices are disclosed that can be integrated in a platform for material handling vehicle and manufacturing systems. In certain embodiments, tracking devices can provide tracking and auditing of shipment items by using a method of capturing video of shipment items as they are being handled. In certain embodiments, tracking devices can be coupled to video cameras. The video to be captured may be determined based on the information collected and/or commands received in relation to the items. In some embodiments, the method can create metadata and associate video and item information for shipment items handled in a facility. The video and metadata can be accessed through a communication network at a later time for tracking, auditing and other purposes.

12 Claims, 4 Drawing Sheets

(51) Int. Cl.
*G11B 31/00* (2006.01)
*H04N 5/76* (2006.01)
*H04N 5/77* (2006.01)
*H04N 9/82* (2006.01)
*B60R 1/00* (2006.01)

(52) U.S. Cl.
CPC ............ *H04N 5/7605* (2013.01); *H04N 5/77* (2013.01); *H04N 5/772* (2013.01); *H04N 9/8205* (2013.01)

(58) Field of Classification Search
USPC ...................................... 348/86–92; 386/228
See application file for complete search history.

(56) References Cited

U.S. PATENT DOCUMENTS

| | | | |
|---|---|---|---|
| 5,465,207 A | 11/1995 | Boatwright | |
| 5,625,410 A | 4/1997 | Washino | |
| 5,712,789 A | 1/1998 | Radican | |
| 5,780,826 A | 7/1998 | Hareyama | |
| 5,834,753 A | 11/1998 | Danielson | |
| 6,047,889 A | 11/2000 | Williams | |
| 6,148,291 A | 11/2000 | Radican | |
| 6,421,080 B1 * | 7/2002 | Lambert | H04N 7/181 348/143 |
| 6,505,778 B1 | 1/2003 | Reddersen | |
| 6,983,883 B2 | 1/2006 | Ridling | |
| 7,243,847 B2 | 7/2007 | Zhu | |
| 7,286,683 B2 | 11/2007 | Hadell | |
| 7,293,711 B2 | 11/2007 | Brock | |
| 7,508,956 B2 | 3/2009 | Scheppmann | |
| 7,922,085 B2 | 12/2011 | Thomas | |
| 8,081,849 B2 | 12/2011 | King | |
| 8,152,071 B2 | 10/2012 | Doherty | |
| 8,366,005 B2 | 2/2013 | Kotlarsky | |
| 9,230,250 B1 * | 1/2016 | Parker | G06Q 20/203 |
| 2002/0005895 A1 * | 1/2002 | Freeman | H04N 5/772 348/143 |
| 2002/0105578 A1 | 8/2002 | Hunter | |
| 2003/0098352 A1 | 5/2003 | Schnee | |
| 2003/0217870 A1 | 11/2003 | Ridling | |
| 2004/0212833 A1 * | 10/2004 | Taskett | G06Q 10/08 358/1.18 |
| 2006/0106742 A1 | 5/2006 | Bochicchio | |
| 2009/0059004 A1 * | 3/2009 | Bochicchio | B66F 9/0755 348/148 |
| 2009/0095047 A1 | 4/2009 | Patel | |
| 2010/0054010 A1 * | 3/2010 | Darroman | B60L 1/00 363/131 |
| 2010/0057592 A1 | 3/2010 | Moir | |
| 2010/0057593 A1 | 3/2010 | Moir | |
| 2011/0271125 A1 * | 11/2011 | Sivertsen | G06F 1/18 713/300 |
| 2012/0169832 A1 | 7/2012 | Morishita | |

OTHER PUBLICATIONS

VisionAudit, NuminaGroup—retrieved from the web on Aug. 8, 2014 (http://www.numinagroup.com/order-fulfillment-automation/pack/32-vision-audit-order-validation), p. 1-2.
Intermec on the Forklift: A Complete Solution for Material Handling, Intermec technologies Corporation, product catalog, Jan. 2012, pp. 1-2, Washington, USA.

* cited by examiner

DEVICES, SYSTEMS AND METHODS FOR TRACKING AND AUDITING SHIPMENT ITEMS

CROSS-REFERENCE TO RELATED APPLICATIONS

This application claims the benefit of U.S. Provisional Patent Application No. 62/031,456, filed on Jul. 31, 2014. The present application is related to co-pending, commonly assigned U.S. patent application Ser. No. 14/590,741, now U.S. Pat. No. 9,613,332, concurrently filed with the present application. The contents of the above-identified applications are incorporated by reference in their entirety as if recited in full herein.

FIELD OF THE INVENTION

The present invention relates generally to shipment transportation and facility logistics. More particularly, the present invention relates to devices, systems and methods for tracking and auditing shipment items in a facility by recording and storing video content of the shipment items.

BACKGROUND

In the field of shipment transportation and facility logistics, it is common to track and audit shipment items that are being handled within a facility for various reasons. For example, tracking and auditing shipment items can provide information on possible human mishandling of the shipment items during various logistics operations. Generally referring to the coordination and transportation of resources including goods and equipment, logistics often relies on the use of distribution centers. These are large facilities such as warehouses that store items for a variety of uses. Given the potential losses that can occur due to possible damages within a facility, it is common in the field to insure the items. Insuring shipment items, provides coverage in the case of accidents and/or damages as a result of their transportation in a facility. However, once a shipment item has been damaged, it is important to understand the reasons that caused the damage for streamlining and efficiency purposes. Additionally, being able to provide an explanation and trail of the incurred damages may be helpful in retrieving the item's costs by submitting successful insurance claims. Thus, it is important to be able to provide a way for tracking and auditing the resource items as they are being handled within a facility such as a distribution center.

Tracking and auditing shipment items and materials is also prominent in the field of manufacturing. Specifically, manufacturing as it relates to the use of conveyor belts on which goods can be placed, assembled and/or transported within a facility. Tracking and auditing of shipment items in a manufacturing environment is helpful for similar reasons to the ones described above. For example, having the ability to provide an auditing trail of shipment items can help satisfy insurance requirements. Additionally, in many instances, items that are being manufactured may become defective or compromised due to machinery malfunctions along the conveyor belts. However, depending on the complexity of the manufacturing chain, identifying the source of the problem may require cessation of operations, which can result to substantial financial losses. As a result, there is a need for tracking and auditing items as they are being handled in manufacturing facilities, whether on conveyor belts or elsewhere.

One primitive approach for tracking and auditing items and resources in general is to do so manually, i.e., through the use of human surveyors for each and every item that is being handled. For example, in the context of a distribution center or warehouse facility, an item will be generally handled by a fork lift or tow truck. In order to track and audit the item as it is being handled by the fork lift or tow truck, an additional person besides the driver would be deployed to act as a surveyor and document the process. Similarly, in the context of manufacturing, human surveyors may need to be placed in between manufacturing conveyor belts depending on the complexity of the site, in order to provide effective tracking of the items. Needless to say, the cost, in terms of time and monetary expense, of such manual review becomes impracticable as the size and scale of the warehouse facility or manufacturing site increases. Moreover, even if each item is reviewed manually, such an effort is error-prone and unlikely to correctly track and identify the entire set of items that may have incurred damage.

In many cases, variations of the above mentioned approach are used. For example, self-reporting by a fork lift driver or assembly line employee during the handling of the items is a common practice. However, this practice is prone to the same problems presented previously and additionally may not be preferred for insurance purposes.

Another commonly employed methodology for tracking and auditing shipment items is the use of surveillance cameras. This approach has several added advantages such as the recording of video that can be stored in digital form or the ability to survey a large warehouse facility or manufacturing site for item handling purposes as well as security purposes. However, in the case of an insurance claim due to item damage, this method still relies on manually filtering the recorded surveillance video by a human surveyor. Moreover, the quality and detail of the recorded video is highly correlated to the specific hardware and overall infrastructure being used for the surveillance system. Additionally, the storage requirements for this approach are highly expensive since the filtering of the recorded video will only occur upon request for a specific action such as an insurance claim. As a result, this method is also prone to errors or inability to track and audit all items that may be damaged due to their handling.

In light of the foregoing, many technological tools have been developed in an effort to reduce reliance on human involvement and improve performance and efficiency in the field of shipment transportation and facility logistics and manufacturing, but also specifically as it relates to the tracking and auditing of items and resources. These tools employ computerized systems executing software algorithms that attempt to identify and retrieve portions of the recorded videos that contain a specific item. Furthermore, the use of optical codes as identifiers for objects enables the association of data with an object that can then be easily transferred, edited and/or displayed. As a result, fork lifts and other material handling vehicles are being fitted with vehicle mounting computing devices and are able to perform data collection and presentation of the collected item information to the user.

An example of a commercially available tool for distribution centers, warehouse operations and manufacturing operations that utilizes computer-based solutions for material and item handling is the Intermec Forklift System by Honeywell Inc. The system is an example of a mobile computing and data collection assisted tool that is used for tracking fork lifts in a facility and increasing inventory accuracy by tracking item misplacements. However, the use of these computer assisted systems in a logistic or manufacturing setting does not provide a complete system for the tracking an auditing of shipment items. These systems rely on the use of human surveyors and do not provide a detailed and complete auditing trail of shipment items in a facility.

Therefore, there is a need for a more efficient and effective system for the tracking an auditing of shipment items that can capture video of the handling of the items in a reliable and time efficient manner while maintaining a low digital storage cost and minimizing the use of manpower. Moreover, there is a need for such a system to be implemented in a portable, user-friendly, and compatible solution that may be used commercially with pre-existing products. Furthermore, there is a need for such a tracking and auditing system to have broad applications beyond logistics and manufacturing, so as to be advantageously usable in any electronic tracking, auditing or item handling system, especially forward looking situations.

SUMMARY OF THE INVENTION

Devices, systems and methods for tracking and auditing shipment items are disclosed. These devices, systems and methods provide an efficient platform for capturing, storing and cataloging video of shipment items that are being handled in a facility and that are easily scalable for large and complex facilities and uses. These tools may be used for the purpose of identifying any source of damages caused to the items because of the handling in the facility. Such video recordings can be used as evidence to support or reject insurance claims made in connection with the items. Additionally, these tools may be used for identifying and tracking defective products and the source of the mishandling and/or malfunction in a manufacturing conveyor belt setting, providing enhanced and customizable security for desired shipment items, and for providing a quantitative assessment of the workforce and policies in a logistic or manufacturing environment.

In some embodiments, devices and systems for tracking and auditing shipment items by capturing video of the items handled in a facility are placed on material handling vehicles such as fork lifts or tow trucks, or even adjacent to conveyor belts. Components of such devices can be powered by the vehicle's power source (e.g. fork lift's battery) and can be connected to one or more video cameras that record video of the shipment items as they are being handled in the facility. An exemplary device, comprises a hardware processor and a storage medium such as a hard drive or any other suitable form of a storage medium that stores the recorded video. An inverter can be connected to the vehicle's battery to convert the battery's direct current to alternating current that can power the hardware processor. Additionally, the one or more video cameras can be connected to an integrated power and data supply that allows for both a wired and wireless connection with the hardware processor. In some embodiments, the device may comprise a transceiver that may be coupled to the hardware processor and that may be used for transmitting the stored video and any other suitable data to a remote database located, for example, on a server and/or device.

In some embodiments, the invention provides devices, systems and methods for tracking and auditing shipment items that are capable of communicating with a shipment instruction device, which can provide a fork lift operator with a list of shipment items and actions that need to be taken regarding these items. One or more cameras may then be activated such that they continuously record video content in a loop for the duration of their buffers, until a triggering event occurs. For example, a triggering event can be the scanning of the shipment item's bar code in response to a corresponding action by the operator. Once the item has been scanned, information regarding the item and corresponding action(s) to be performed may be received. For example, a fork lift driver may receive information that the shipment item should be moved, loaded, inspected or any other suitable action. Moreover, the item information can include a unique identifier for the item, dimensions, corresponding instructions and/or any pertinent geographical information indicating location.

To track and audit the shipment items, certain relevant video content is captured, stored and transferred to a remote location. The desired video content may correspond to a key time interval pertaining to when the operator takes a certain action relating to the item. Therefore, certain time durations may be determined as to when to retrieve video content captured by the one or more cameras that are continuously recording in a loop, depending on the action. Specifically, depending on the received action for the item (e.g. unload package, load package etc.), two time durations may be associated to that specific action in accordance with some embodiments. The first time duration may indicate the amount of video to be retrieved from the buffer that has been continuously recording. Once the first amount of video has been retrieved, the one or more cameras can restart recording for the second time duration and a second video corresponding to the second time duration is retrieved. Each of the videos may be consolidated and/or combined with the item and action information for local storage and subsequent transmission to a server.

Devices, systems and methods for tracking and auditing of shipment items are capable of receiving item and action information from a shipment instruction server and transmitting item and action information as well as the retrieved videos to an auditing server in accordance with some embodiments. Additionally, devices, systems and methods are disclosed for implementing such a solution as an integrated, portable, and compatible system. For example, the device can be implemented by using components, or being coupled to a standard PC computer, tablet, laptop, smartphone, or any other suitable device. Such a device may run a standard operating system (e.g., Windows, Linux, OSX, Android, iOS), and the including instructions for operating the device can be installed and/or run as one or more programs or libraries on the device itself. When the device is, for example, coupled to a laptop, tablet, or smartphone, the system is easily transportable and compatible with any existing shipment instruction device. Such a device may or may not be further connected to one or more computers or other devices via a network.

The above devices, systems and methods therefore provide automated, portable, and integrated solutions for tracking and auditing shipment items by recording action-specific video during the handling of an item, while requiring less computational resources (e.g., workstations, servers, and infrastructure), and less manpower to initiate, maintain and oversee the tracking and auditing of such items.

The devices, systems and methods for tracking and auditing shipment items described herein are preferably advantageous for capturing video of shipment items handled in a distribution center facility, a warehouse or in a manufacturing setting, as well as a wide variety of additional areas in which tracking and auditing of shipment and other items is desirable. For example, in law enforcement, security, and for surveillance applications, such a system could be used to uncover possible tampering of items that can be perceived as threats, or aid as a supplemental surveillance element for the detection of fraud. Additional examples include medication screening and public transportation accident auditing.

BRIEF DESCRIPTION OF THE DRAWINGS

Further features of the invention, its nature and various advantages will be more apparent from the following detailed description of the embodiments, taken in conjunction with the accompanying drawings in which.

DETAILED DESCRIPTION OF EMBODIMENTS OF THE INVENTION

Devices, systems and methods are provided for tracking and auditing shipment items by recording targeted video content for these items as they are being handled in a facility. The following description starts with an overview of an exemplary system, which illustrates an operating environment for the exemplary device disclosed herein. From there, further details are provided regarding the exemplary device and overall system components and processes that may be implemented in accordance with various embodiments of the invention. A variety of additional aspects are also discussed below.

In the following description, reference is made to the accompanying drawings that form a part hereof, and in which is shown by way of illustration specific embodiments in which the invention may be practiced. It is to be understood that other embodiments may be utilized and structural changes may be made without departing from the scope of the present invention. Furthermore, although exemplary embodiments are discussed in the context of a shipment item being handled in a facility by one or more tracking and auditing devices, systems and methods, one of ordinary skill in the art will appreciate that the principles of the invention are applicable to any tracking, monitoring and auditing item effort in any appropriate field such as law enforcement, manufacturing and compliance.

Figure 1:
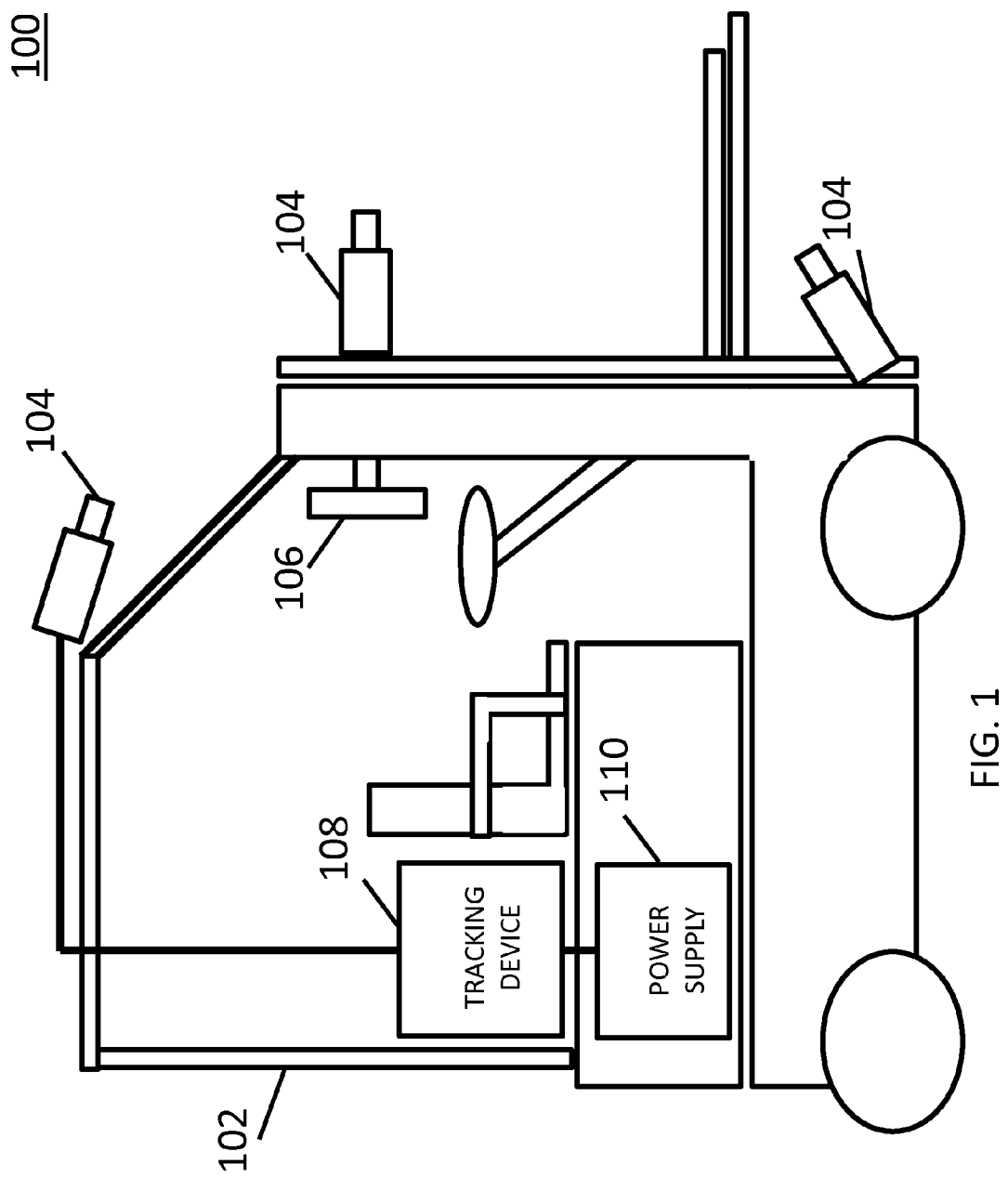
FIG. 1 is a block diagram illustrating a tracking and auditing system in accordance with some embodiments.

Referring now to the drawings in which like numerals represent the same or similar elements, FIG. 1 represents an overview of a tracking and auditing system 100 for shipment items handled in a facility. System 100 provides a solution to the problem of tracking and auditing shipment items by recording, storing and indexing video as the items are being handled by material handling vehicle 102. In some embodiments, material handling vehicle 102 can be a fork lift, a tow truck or any other suitable vehicle able to transport and/or handle shipment items.

In some embodiments, one or more video cameras 104 are placed on material handling vehicle 102 in order to record the handling of shipment items in a facility. Video cameras 104 can be placed on various locations of material handling vehicle 102 to obtain multiple viewing angles of a shipment item. For example, one or more video cameras 104 can be placed angled and/or flat on the top, bottom and/or front of material handling vehicle 102 or in any other suitable configuration, in accordance with some embodiments of the invention. Video cameras 104 can be any suitable device able to record video for a duration related to a buffer in both an intermittent and continuous manner. For example, video cameras 104 can be one or more camcorder, digital video camera, closed-circuit camera, smartphone camera or any other suitable video camera and/or combination thereof.

In some embodiments, material handling vehicle 102 can include shipment instruction device 106. Specifically, device 106 can receive, provide, and display information about shipment items in a facility from and to a material handling vehicle's operator. For example, shipment instruction device 106 can be any suitable device such as a mounted computing device or hand held device that can be located on material handling vehicle 102. It is typical to use a shipment instruction device 106 in the field of shipment item transportation and facility logistics. A common and exemplary use of shipment instruction device 106 in the field is the receipt of instructions and information by the material handling vehicle operator. In some embodiments, the operator can receive, via device 106, information on the shipment item such as an identifier, its destination and/or its location in the facility. Additionally, an operator can receive instructions such as loading, unloading, moving and/or inspecting a shipment item in the facility. For example, when the operator receives the instruction to load a shipment item he/she will drive material handling vehicle 102 to the location of the item obtained from shipment instruction device 106. In some embodiments, once there, the operator can scan the shipment item using shipment instruction device 106 and confirm its identifier.

Shipment instruction device 106 can be directly connected to tracking device 108 using a wired and/or wireless connection in accordance with some embodiments of the invention. Tracking device 108 can then receive item and action information from shipment instruction device 106. Tracking device 108 can be powered by power supply 110. For example, power supply 110 can be the material handling vehicle's battery or any other suitable form of direct current power. Tracking device 108 can then power and control one or more video cameras 104 and can record video for a specific duration based on the action information communicated by shipment instruction device 106.

In some embodiments, tracking system 100 can be employed in any scale. For example, a tracking and auditing system can include any number of material handling vehicles 102, comprising any number cameras 104 capable of recording video and any number of tracking devices 108 that can communicate with one another or with any other device. For example, a fleet of fork lifts can have a network of tracking devices that can cross-reference item and action information between different fork lifts, thus the system can be capable of obtaining multiple videos from different fork lifts, for a shipment item.

Figure 2:
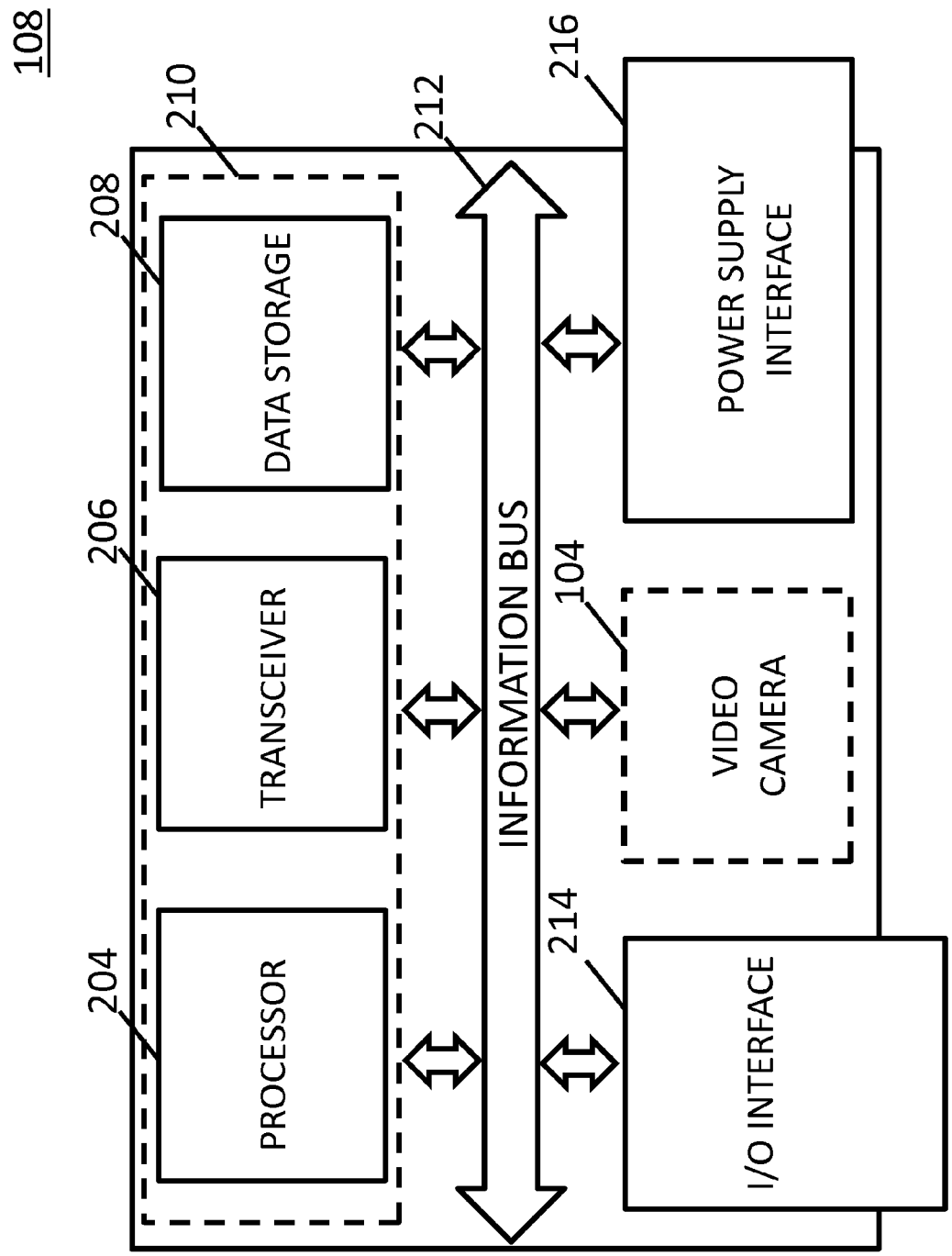
FIG. 2 is a block diagram illustrating a tracking and auditing device for shipment items according to certain embodiments.

Turning to FIG. 2, tracking device 108 is disclosed, providing a platform for tracking and auditing shipment items on which system 100 of FIG. 1 may be implemented. As shown therein, tracking device 108 can include computing device 210. In some embodiments, computing device 210 may be equipped with processor 204, transceiver 206 and data storage 208. In some embodiments, any of processor 204, transceiver 206 and data storage 208 can be separate components instead of part of a single component such as computing device 210. Processor 204 can be a microprocessor, a central processing unit or any other suitable circuit capable of executing computer instructions. Transceiver 206 can be any suitable circuit capable of transmitting and receiving data such as a radio frequency transceiver and/or Ethernet transceiver. Data storage 208 can be any suitable computer storage device such as RAM, ROM, PROM, and/or SRAM and is preferably a physical, non-transitory medium.

In some embodiments, tracking device 108 can include one or more video cameras 104 capable of recording video. Video camera 104 can be embedded into device 108 or connected externally to device 108 (e.g., as shown in FIG. 1) using any suitable connection. For example, video camera 104 can include one or more camcorder, digital video camera, closed-circuit camera, smartphone camera or any other suitable video camera and/or combination thereof.

Tracking device 108 can be powered using power supply interface 216 in accordance with some embodiments of the invention. For example, power supply interface 216 can include a Power over Ethernet system capable of passing electrical power along with data that can power video cameras 104. In some embodiments, power supply interface 216 can be an uninterruptible power supply capable of providing emergency power to computing device 210, an inverter that can convert power from a direct current power source such as power supply 110 to an alternating current that can power computing device 210 or any suitable combination thereof. In some embodiments, power supply interface 216 including power supply 110 and computing device 210 can be separate components and/or can be part of a single interface.

In some embodiments, tracking device 108 can include input/output (I/O) interface 214 that is capable to connect with any other suitable device such as a computing device and/or peripheral device or any suitable combination thereof. In some embodiments, I/O interface 214 can connect tracking device 108 and camera(s) 104 to obtain the recorded video of a shipment item. Additionally, I/O interface can be used to directly connect tracking device 108 with an external computer for configuration and maintenance purposes such as the use of tracking device 108 in a different facility requiring different location parameters. In some embodiments, I/O interface 214 can be connected to peripheral components such as a printing device and/or a screen. For example, I/O interface can include one or more HDMI connections for the transfer of video data from camera 104, one or more Firewire connections, one or more USB connections for the transfer of data and/or any suitable combination thereof.

The components of tracking device 108 can communicate using information bus 212. For example, computing device 210 can exchange data with I/O interface 214, power supply interface 216 and one or more video cameras 104 in accordance with some embodiments of the disclosed invention. Information bus 212 can be an internal bus such as a memory bus, system bus and/or any suitable bus capable of connecting for example, processor 204, transceiver 206 and data storage 208. In some embodiments, information bus 112 can be an external bus such as an expansion bus or any other suitable form of bus that can for example, connect computing device 210 with I/O interface 214, video camera 102 and power supply interface 216.

It should be noted that the device in FIG. 2 is merely meant to demonstrate an exemplary embodiment of a tracking device, and should not be construed as limiting in any manner whatsoever. The particular configuration in FIG. 2 can be altered in numerous ways without departing from the principles herein. For example, video camera 104 can be integrated in tracking device 104 or one or more cameras may be integrated and/or externally connected to computing device 210. In some embodiments, computing device 210 and/or any of processor 204, transceiver 206 and data storage 208 can also be integrated in tracking device 104

Figure 3:
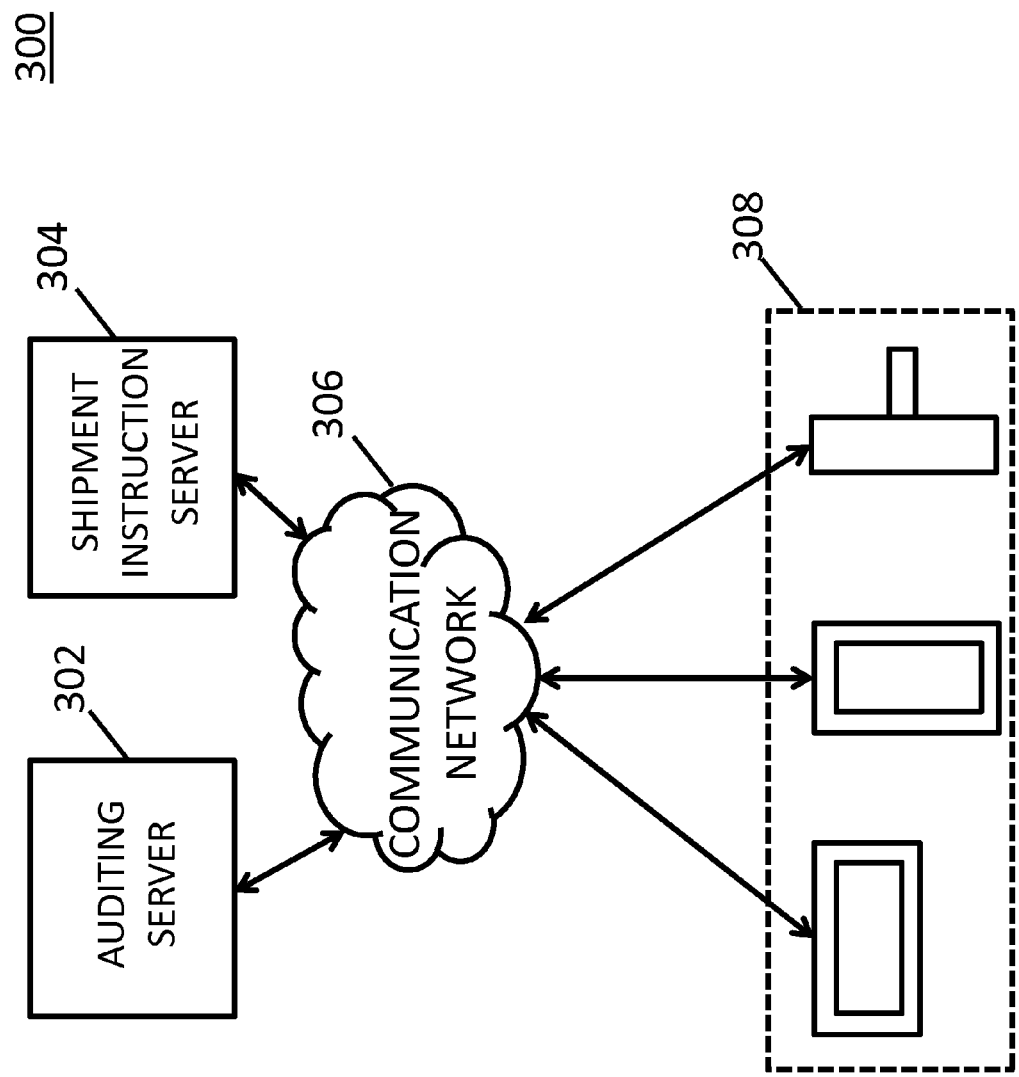
FIG. 3 is a block diagram illustrating an additional system suitable for use in tracking and auditing shipment items in accordance with some embodiments.

FIG. 3 shows system 300 for tracking and auditing shipment items in accordance with some embodiments of the invention. System 300 can have a plurality of client devices 308 that can be in communication with auditing server 302 and shipment instruction server 304 over communication network 306. The network may be any type of network such as one that includes the Internet, a local area network, a wide area network, an intranet, etc. Client devices 308 can be used to communicate with auditing server 302 and shipment instruction server 304. Client devices 308, as well as auditing server 302 and shipping instruction server 304, may be configured to communicate via wired or wireless links, or a combination of the two.

Client devices 308 can represent a desktop computer, laptop computer, cell or smart phone, tablet device, or other type of computing device. Each of the client devices 308 can be equipped with one or more computing devices 210, data storage devices 208 (e.g., RAM, ROM, PROM, and/or SRAM) and/or one or more components of computing device 210 such as processors 204 (e.g., a central processing unit) that are capable of executing computer program instructions. Any of client devices 308 may further include a display that is capable of displaying item and action information for a shipment item that can be received by shipment instruction server 304 in accordance with some embodiments of the invention. Client devices 308 can be tracking device 108 and shipment instruction device 106 in separate devices that can communicate via communication network 306. In some embodiments, client devices 308 can be tracking device 108 and shipment instruction device 106 integrated in a single device. For example, the operator of material handling vehicle 102 can receive action and item information for a shipment item on a client device 308 such as a smartphone. The operator can then drive to the shipment item and use the smartphone to scan the item. The smartphone can then activate cameras 104 including its own to record video for tracking and auditing the shipment item.

Auditing server 302 and shipment instruction server 304 can also include one or more processors 204 and one or more data storage devices 208. Auditing server 302 may generally represent any type of computing device that is capable of communicating with a client device 308. In some embodiments, auditing server 302 can cause information such as video content data, action and/or item information to be associated and stored in a database that maintains video and/or information about shipment items in a facility. In some embodiments, shipment instruction server 304 can communicate with shipment instruction device 106 that can be any of client devices 308 to provide item and action information. Additionally, shipment instruction server 304 can also receive information on a shipment item when, for example, an operator scans an item upon locating it in the facility. In some embodiments, auditing server 302 and shipment instruction server 304 comprise one or more mainframe computing devices that execute a web server for communicating with client devices 308 over communication network 306. For example, auditing server 302 and shipment instruction server 304 can be located and configured in the same facility or can be external to the facility.

One useful feature provided by system 300 relates to the fact that a number of client devices 308 such as tracking devices 108 may communicate through communication network 306. This useful feature can permit for example a fleet of material handling vehicles 102 that receive item and action information for different shipment items from shipment instruction server 304 to be able to associate the recorded videos from the different tracking devices 108 based on the locations of the shipment items.

In some embodiments, client devices 308 can be used in manufacturing. For example, client devices 308 including tracking device 108 can be placed next to conveyor belts and can record video of the path that a shipment item has traveled on the conveyor belts by associating the video recordings obtained from different tracking devices 108. The video can then be combined and send to auditing server 302. In some embodiments, client devices 308 can be mounted on locations that can capture the handling of shipment items as they are placed on and/or removed from the conveyor belt by a handler.

It should be noted that the system in FIG. 3 is merely meant to demonstrate an exemplary embodiment of an operating environment, and should not be construed as limiting in any manner whatsoever. The particular configuration in FIG. 3 can be altered in numerous ways without departing from the principles herein. For example, it should be noted that the functionality of auditing server 302 and/or shipment instruction server 304 in FIG. 3 may be carried out by a plurality of servers. Likewise, although the figure depicts a single auditing server 302 and shipment instruction server 304 connected to three client devices 308, any number of auditing servers 302, shipment instruction servers 304 and client devices 308 may be utilized with system 100.

Furthermore, while FIG. 3 illustrates a plurality of client devices 308 in communication with an auditing server 302 and shipment instruction server 304 over a network 306, it should be recognized that the functionality provided by auditing server 302 and shipment instruction server 304 to client devices 308 may be performed locally on each of client devices 308. For example, client devices 308 may utilize an application and/or server that executes locally on client devices 308. Thus, any functionality of auditing server 302 and shipment instruction server 304 which is described herein can alternatively be implemented by a client device 308, and vice versa.

In certain embodiments, client device 308, auditing server 302 and shipment instruction device (e.g., 106 in FIG. 1) can be integrated into a single device (e.g., a standard PC computer, tablet, laptop, smartphone, or other device). For example, such a device may run a standard operating system (e.g., Windows, Linux, OSX, Android, iOS). When a device is, for example, a laptop, tablet, smartphone or similar, a tracking and auditing system is easily transportable. Such a device may or may not be further connected to one or more computers or other devices via a network. When configured to operate without a network connection, tracking and auditing system 300 requires little infrastructure beyond the device itself. Because only a single device may be required to implement tracking and auditing system 300, it is apparent that such an embodiment achieves significant savings in costs, infrastructure and complexity.

Embodiments described herein may be hardware-based, software-based or may comprise a mixture of both hardware and software elements. Thus, while the description herein may describe certain embodiments, features or components as being implemented in software or hardware, it should be recognized that any embodiment, feature or component that is described in the figures or description herein may be implemented in hardware and/or software. In certain embodiments, particular aspects are implemented in software, which includes but is not limited to firmware, resident software, microcode, etc.

Figure 4:
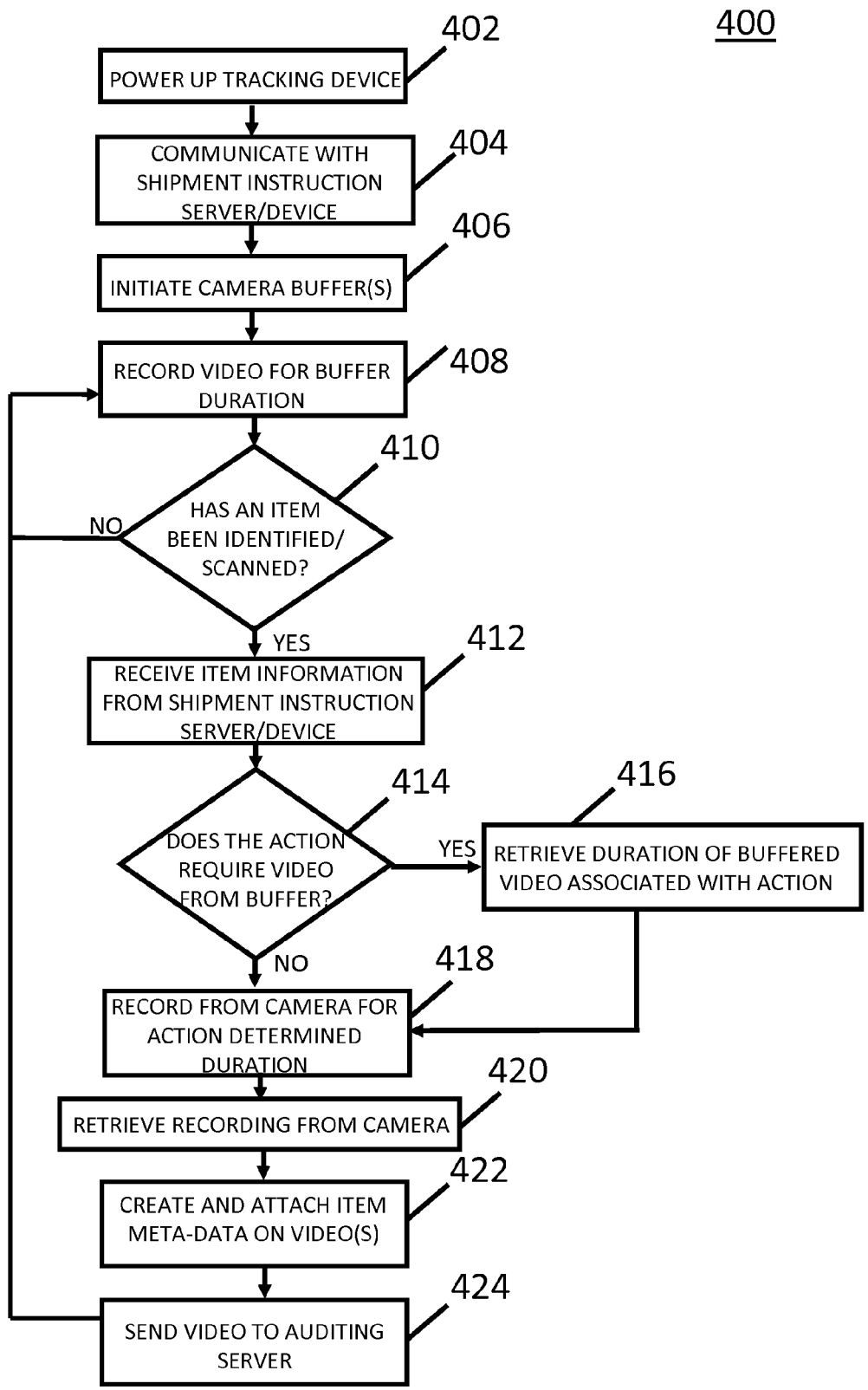
FIG. 4 is a flow diagram illustrating a process for capturing video of shipment items in a facility according to certain embodiments.

FIG. 4 illustrates an exemplary method 400 for tracking and auditing shipment items in accordance with certain embodiments of the invention. Initially, tracking device 108 that can be integrated in client devices 308 may be powered up at step 402. In certain embodiments, tracking device 108 may be powered up by power supply 110 and/or power supply interface 216. For example, tracking device 108 can be directly connected to the battery of material handling vehicle 102. Additionally, tracking device 108 may directly connect to an uninterruptible power supply in the case of the vehicle's power loss.

After tracking device 108 has been powered up, it can communicate with shipment instruction server 304 and/or shipment instruction device 106 at step 404. In some embodiments, the communication can happen through communication network 306 and/or I/O interface 214 using a dedicated connector.

At step 406, tracking device 108 can prepare the one or more video cameras 104 for recording by initiating their buffers. In some embodiments, the buffers of video cameras 104 can be set to be capable to record and store locally video for a specific time duration. In some embodiments, one or more video cameras 104 can have buffers of different durations. Once the buffers of video cameras 104 have been initiated at step 406, then tracking device 108 can record video for the duration of the buffers at 408.

Referring back to FIG. 1 and system 100, an operator of the material handling vehicle 102 can receive action and item information at shipment instruction device 106 regarding a shipment item in accordance with some embodiments of the disclosed invention. For example, the operator may receive a command to inspect a shipment item located in a warehouse facility. As the operator travels through the warehouse, tracking device 108 can instruct video camera(s) 104 to record video for the duration of the one or more cameras' buffers as indicated at step 408 until a triggering event is caused at step 410. Camera(s) 104 can record in a continuous loop and can store the duration of the video content locally in the buffer. Once the buffer has filled up, cameras 104 can continue to record by over-writing the video content stored in the buffer In some embodiments, a triggering event can be the receipt of the item and action information by tracking device 108. For example, receiving by the tracking device an identification number unique to the shipment item. Specifically, an operator can scan a shipment item in the facility using one or more of client devices 308 including shipment instruction device 106. Subsequently, shipment instruction server 304 can receive item information and the shipment item can be identified by scanning a bar code, a quick response code or any other suitable optical code using an optical receiver device, in accordance with some embodiments of the invention. The shipment item can also be identified by the operator manually providing an identification number to the shipment instruction device that is in contact with the tracking device.

Referring back to system 100, if an operator upon receiving the command to inspect has not reached the shipment item and has not been able to scan or otherwise identify it (e.g., "NO" at 410) then tracking device 108 can continue to record video for the duration of the buffer in camera(s) 104.

In some embodiments, if an operator upon receiving the command to inspect, reaches the shipment item and scans its barcode, (e.g., "YES", at 410) then tracking device 108 can receive item and action information from the shipment instruction device 106 and/or server at step 412. For example, tracking device 108 can access the information that the operator of the material handling vehicle obtained from the shipment instruction device 106.

In some embodiments, the item information can include information on the dimensions of the item, a unique identifier, location in the facility and/or any other suitable information. Action information can include the loading, unloading moving and inspection of the shipment item within the facility or any other suitable handling of the shipment item.

Depending on the action information that the operator of material handling vehicle 102 receives, tracking device 108 can determine at step 414 whether to retrieve recorded video from the buffers of one or more cameras 104 in accordance with some embodiments of the invention. For example, if the action received at step 412 indicates that the operator needs to unload a shipment item (e.g., "YES", at 414) then tracking device 108 can retrieve a specific duration of video from the buffer associated with the action of unloading at step 416. For example, as the operator drives to the location of the shipment item, cameras 104 are recording in a loop based on their buffers. The operator would then handle and retrieve the item to scan it (e.g., "YES", at 410). Once the shipment item is scanned, step 414 can determine the retrieval duration of the item corresponding to the unload action. In some embodiments, loading, unloading, inspecting and/or moving a shipment item may require different durations of recorded video to be retrieved from the buffers of one or more cameras 104. In some embodiments, receiving the actions of moving and inspecting at step 416 may not require retrieval of video from the buffer (e.g., "NO", at 414). For example, if the operator does not need to handle and retrieve an item for inspection, then once the item is scanned (e.g., "YES", at 410), tracking device 106 causes cameras 104 to record for a duration associated with inspecting an item (e.g., step 418). In some embodiments, the operator may by pass the system and manually insert a duration for recording an item. Additionally, durations of recorded video can depend on the placement of camera(s) 104 on material handling vehicle 102. For example, a camera located on the rear of the vehicle can have a larger duration of video recording than a camera placed upfront.

If the action information received by tracking device 108 does not require video from the buffer (e.g., "NO", at 414) or if tracking device 108 has already retrieved a specific duration of video from the buffer at step 416, then tracking device 108 can restart or continue recording using one or more cameras 104 for a determined amount of time based on the action information at step 418. In some embodiments, tracking device 108 restarts recording by resetting the buffers of the one or more cameras. Specifically, in some embodiments, the duration of the recording for loading and unloading a shipment item may be larger than the duration for moving and/or inspecting a shipment item.

Tracking device 108 can then retrieve the additional recording from the buffers of the one or more cameras at step 420. Tracking device 108 can then store the video in storage 208 in accordance with some embodiments of the invention. For example, tracking device 108 can store the video locally on data storage 208, on any of client devices 308, and/or remotely to a database on auditing server 302 using communication network 306.

At step 422, tracking device 108 can associate the item information that it received from shipment instruction device 106 and/or shipment instruction server 304 with the videos stored in data storage 208. Tracking device can then create and attach metadata to the videos based on the item information received from the shipment instruction device and/or server. For example, metadata can include the identifier of the shipment item, dimensions and/or any other suitable textual information that can assist any keyword searches. In some embodiments, metadata can be provided as a separate file to the video using a text format, it can be directly embedded on the video or it can be in any combination thereof.

In some embodiments, tracking device 108 can then send the videos and metadata associated to the shipment item to auditing server 302 or any other suitable data storage device (e.g., data storage 208) at step 424. Once tracking device 108 has sent the video and metadata to auditing sever 302, it returns to step 408 and can start recording in a loop for the duration of the buffers until a new shipment item has been scanned and/or identified.

One of ordinary skill in the art will appreciate that, aside from providing advantages in tracking and auditing shipment items, the devices, systems and methods discussed throughout the disclosure herein may be applicable to a wide variety of fields that require tracking and auditing. Exemplary areas of potential applicability are logistics, manufacturing, compliance and surveillance, as well as tampering detection.

While there have been shown and described various novel features of the invention as applied to particular embodiments thereof, it will be understood that various omissions and substitutions and changes in the form and details of the devices, systems and methods described and illustrated, may be made by those skilled in the art without departing from the spirit of the invention. Those skilled in the art will recognize, based on the above disclosure and an understanding therefrom of the teachings of the invention, that the particular hardware and devices that are part of the invention, and the general functionality provided by and incorporated therein, may vary in different embodiments of the invention. Accordingly, the particular system components shown in FIG. 1-FIG. 4 are for illustrative purposes to facilitate a full and complete understanding and appreciation of the various aspects and functionality of particular embodiments of the invention as realized in system and method embodiments thereof. Those skilled in the art will appreciate that the invention can be practiced in other than the described embodiments, which are presented for purposes of illustration and not limitation, and the present invention is limited only by the claims which follow.

What is claimed is:

1. A system for capturing video of shipment items handled in a facility, the system comprising:
    at least one video camera configured to record video content data for a duration associated with a buffer in coordination with at least one physical operation for loading, unloading, inspecting, or moving shipment items;
    an auditing server capable of receiving the video content data; and
    a processing device that is coupled to the at least one video camera and that is configured to:
        communicate with a shipment instruction server;
        initiate recording from the at least one video camera for the duration of the buffer and cause continued recording for the duration of the buffer until a triggering event is caused;
        in response to the triggering event, receive action and item information on a shipment item from the shipment instruction server and determine first and second durations of video content data using an adaptive video capture procedure based on the received action information and item information associated with the at least one physical operation, wherein the adaptive video capture procedure selectively generates a concatenated video file from continuously recorded video content data;

retrieve first video content data associated with the first duration of the video content data from the buffer;

restart recording from the at least one video camera for the second duration of the video content data by automatically resetting the buffer, thereby dynamically overwriting existing video content data including the first video content data;

retrieve second video content data associated with the second duration of the video content data from the buffer;

associate the action and item information with the first and second video content data;

cause the action and item information and the first and second video content data to be stored on the storage medium; and transmit the action and item information and the first and the second video content data to the auditing server.

2. The system of claim 1, wherein the at least one video camera and the processing device are mounted on a materials handling vehicle.

3. The system of claim 1, wherein the at least one video camera is placed adjacent to a conveyor belt.

4. The system of claim 1, wherein the triggering event is the receipt of item and action information from the shipment instruction server.

5. The system of claim 1, wherein the item information includes an identifier, dimensions and geographical location.

6. The system of claim 1, wherein the processing device further comprises at least one input/output port configured to communicate with a console.

7. The system of claim 1, wherein the processing device further comprises an auxiliary power source that is configured to supply uninterruptible power to the processing device and the at least one video camera.

8. The system of claim 1, wherein the processing device further comprises an integrated power and data connector.

9. The system of claim 8, wherein the integrated power and data connector is a Power over Ethernet connector.

10. A method for capturing video of shipment items handled in a facility, the method comprising:
instructing at least one video camera to continuously record for a duration of a buffer until a triggering event is caused in coordination with at least one physical operation for loading, unloading, inspecting, or moving shipment items;

receiving action and item information on a shipment item from a shipment instruction server in response to the triggering event;

retrieving first video content data associated with a first duration of the video content data from the buffer using an adaptive video capture procedure based on the received action information and item information associated with the at least one physical operation, wherein the adaptive video capture procedure selectively generates a concatenated video file from continuously recorded video content data;

restarting recording from the at least one video camera for a second duration of the video content data by automatically resetting the buffer, thereby dynamically overwriting existing video content data including the first video content data;

retrieving second video content data associated with the second duration of the video content data from the buffer using the adaptive video capture procedure based on the received action information and item information associated with the at least one physical operation;

associating the action and item information with the first and second video content data;

causing the action and item information and the first and second video content data to be stored on the storage medium; and transmitting the action and item information and the first and second video content data to an auditing server.

11. The method of claim 10, wherein the action information on the item includes loading, unloading, inspecting, or moving the item.

12. The method of claim 10, wherein the first duration of video content data for loading and unloading is larger than the first duration of video content for moving the shipment item.

* * * * *